(12) United States Patent
Kayser

(10) Patent No.: US 6,244,171 B1
(45) Date of Patent: Jun. 12, 2001

(54) ELASTIC COATING FOR A CALENDER ROLL, CALENDER AND PROCESS FOR OPERATING THE CALENDER, AND CALENDER ROLL AND METHOD OF FORMING THE CALENDER ROLL

(75) Inventor: Franz Kayser, Gerdern (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/213,895

(22) Filed: Dec. 17, 1998

(30) Foreign Application Priority Data

Dec. 22, 1997 (DE) ............................................. 197 57 185

(51) Int. Cl.[7] ............................. B30B 13/00; B30B 3/00; B25B 13/00
(52) U.S. Cl. .................. 100/35; 100/155 R; 100/330; 492/58; 492/59
(58) Field of Search ................ 100/155 R, 38, 100/161, 330, 334; 492/58, 59, 7, 9, 20, 46, 48; 106/300; 374/162, 140; 219/462

(56) References Cited

U.S. PATENT DOCUMENTS

| | | | |
|---|---|---|---|
| 3,781,523 | * 12/1973 | Borom | 219/462 |
| 3,956,007 | * 5/1976 | Modly | 106/300 |
| 4,421,560 | * 12/1983 | Kito et al. | 106/21 |
| 4,805,188 | * 2/1989 | Parker | 374/141 |
| 4,852,209 | * 8/1989 | Svenka et al. | 15/308 |
| 5,023,985 | * 6/1991 | Salo et al. | 100/155 R |
| 5,165,797 | * 11/1992 | Kuroda et al. | 374/162 |
| 5,655,444 | * 8/1997 | Kayser et al. | 100/334 |
| 5,922,996 | * 7/1999 | Ryeczek | 174/112 |

OTHER PUBLICATIONS

Gamsjäger et al., "Innovations on Elastic Calender Covers," from Scapa–Kern Walzenbeschichtung GmBH, published at SPCI Stockholm (Jun. 1996).
German Publication "Handbuch der industriellen Messtechnik" 5th ed., 1992, p. 847.
German Publication Römpp Chemie Lexikon, 9th ed., vol. 6, p. 4491.

* cited by examiner

*Primary Examiner*—Peter Vo
*Assistant Examiner*—Louis Huynh
(74) *Attorney, Agent, or Firm*—Greenblum & Bernstein, P.L.C.

(57) ABSTRACT

Calender and process for operating the calender, calender roll and process for forming the calender roll, and a coating for the calender roll. The calender includes at least one calender roll body, and an elastic coating coupled to the at least one calender roll body. The elastic coating includes a colorant to change a color of the elastic coating depending upon a temperature of the elastic coating. The calender roll includes an elastic coating with a colorant, and the elastic coating is adapted to change color depending upon a temperature of the elastic coating. The process for forming the calender roll includes forming an elastic coating that includes a colorant, whereby the elastic coating changes color depending upon a temperature of the elastic coating, and applying the elastic coating to a calender roll body. The process for operating the calender includes guiding a web through the calender, pressing the web between the at least one calender roll and a counter calender roll, monitoring a color of the elastic coating, and adjusting a load for pressing the web in accordance with changes in the color of the elastic coating. The coating includes an elastic material and a colorant adapted to change a color of the elastic material in accordance with a temperature of the elastic material.

30 Claims, 1 Drawing Sheet

ELASTIC COATING FOR A CALENDER ROLL, CALENDER AND PROCESS FOR OPERATING THE CALENDER, AND CALENDER ROLL AND METHOD OF FORMING THE CALENDER ROLL

CROSS-REFERENCE TO RELATED APPLICATIONS

The present applications claims priority under 35 U.S.C. §119 of German Patent Application No. 197 57 185.9, filed on Dec. 22, 1997, the disclosure of which is expressly incorporated by reference herein in its entirety.

BACKGROUND OF THE INVENTION

1. Field of the Invention

The invention relates to an elastic coating for calender rolls, a calender roll equipped with this coating, and a use of this calender roll.

2. Discussion of Background Information

Providing an elastic coating for calender rolls is known in the art of paper finishing. The coating is generally made of compressed fiber rounds and, more recently, of a plastic material. The elasticity of the coating allows compression of the paper to be finished to be evened out, whereby "black glazing" is prevented.

The elastic coatings utilized are often exposed to rather high temperatures, because heat is supplied to the calender rolls as additional deformation energy and because the periodic compression and load alleviation in the coating itself generates heat. If a maximum permissible temperature is exceeded for a certain amount of time, even if only in places, the elastic coating is destroyed and the calender roll becomes unusable. Such overheating arises, e.g., when the compressive strain in the roll nip is set too high or a foreign object, such as a paper strip, adheres to the mating roll.

SUMMARY OF THE INVENTION

The present invention enables better control of problems related to the temperature dependency of the coating.

The present invention the coating may be provided with a color material (colorant) that changes its color depending upon temperature.

The change of color of the color material may almost immediately indicate that a specific temperature has been exceeded. By observing the color material (or the color of the elastic coating with the color material), the operator can draw appropriate conclusions and make countermeasures in a timely manner. Moreover, a control system that monitors the color of the color material can also act automatically.

In this regard, it may be preferable to utilize a color material that changes its color reversibly.

However, advantages may also be realized by utilizing a color material that changes its color irreversibly. The color change may then provide evidence that overheating has occurred, and where the overheating has occurred. This may also be of interest for determining the causes of defects.

In accordance with the present invention, it is not necessary that the color material change its color continuously with temperature. In general, it may be sufficient for the color material to display or exhibit only one color transition that is related to a predetermined temperature.

However, it can be advantageous for the color material to display or exhibit several color transitions, in which each color transition is associated with a predetermined temperature. In this manner, e.g., a critical temperature and/or the approach of the critical temperature can be displayed so that countermeasures can be taken.

In an exemplary embodiment of the instant invention, the color transition may take place or occur at a temperature that lies above a maximum permissible coating temperature. The color transition may be utilized to indicate that the temperature is too high, i.e., that the maximum permissible coating temperature has been exceeded.

Thus, it may be particularly advantageous for the color transition to take place or occur at a temperature that is equal to or somewhat lower than the maximum permissible coating temperature. In this manner, it may be possible to control the calender in such a way so that temperature damage to the coating may be substantially prevented.

The color material may include, e.g., color pigments and/or color crystals. The specific amounts of color pigments and/or color crystals utilized in the color material may be selected so that the color transition occurs at a desired critical temperature and so that the color transition area is compatible with the remaining coating material.

Particularly, the color material may include copper, nickel, cobalt, chrome, vanadium, molybdenum, or uranium salts.

It may be advantageous for the coating to be formed mainly of plastic because plastic may withstand significantly higher temperatures than fibrous materials. Further, plastic may be advantageous because, as a result of the flexing work, the coating may be endangered by localized heating.

Preferably, the color material may be added to the plastic material.

In an alternative embodiment, the color material may be laid onto the surface of the coating.

It may be preferable that the coating be formed, e.g., by an elastic color coat having a relatively thin coating thickness of, e.g., approximately 2 mm or less.

The protection offered by the color material may also extend to protection of a calender roll that is provided with the above-described elastic coating.

In this regard, calender rolls may be protected during use by providing a calender with zone-controlled bending adjustment rolls that are controlled as a function of the color pattern of the coating surface. If the forces exerted by adjacent calender rolls are set to display an even color pattern, it would be apparent that the distribution of force and compressive strain in the roll nip is substantially even.

Accordingly, the present invention is directed to calender apparatus that includes at least one calender roll body, and an elastic coating coupled to the at least one calender roll body. The elastic coating includes a colorant to change a color of the elastic coating depending upon a temperature of the elastic coating.

In accordance with another feature of the present invention, the colorant may be adapted to change color reversibly.

In accordance with another feature of the present invention, the colorant may be adapted change color irreversibly.

In accordance with still another feature of the present invention, the colorant may be adapted to display one color transition related to a predetermined temperature.

In accordance with a further feature of the present invention, the colorant may be adapted to display a plurality of color transitions. Each color transition may be related to a respective predetermined temperature.

In accordance with a still further feature of the present invention, the color transition of the colorant may occur at a temperature above a maximum permissible coating temperature.

In accordance with another feature of the present invention, the color transition of the colorant may occur at a temperature one of equal to and slightly lower than a maximum permissible coating temperature.

In accordance with still another feature of the present invention, the colorant may include color pigments.

In accordance with another feature of the present invention, the colorant may include color crystals.

In accordance with a further feature of the present invention, the colorant may include at least one member selected from the group consisting of copper, nickel, cobalt, chrome, vanadium, molybdenum, and uranium salts.

In accordance with a still further feature of the present invention, the coating may be composed of a plastic material. Further, the colorant may be added to the plastic material.

In accordance with still another feature of the present invention, the colorant may be laid onto the surface of the elastic coating.

In accordance with another feature of the present invention, the elastic coating may be composed of an elastic color coat.

In accordance with a further feature of the present invention, the at least one calender roll may include a deflection adjustment roll having a plurality of press zones, and the plurality of press zones may be controllable as a function of a color pattern of the elastic coating.

The present invention may also be directed to a calender roll that includes an elastic coating with a colorant, the elastic coating is adapted to change color depending upon a temperature of the elastic coating.

The present invention may also be directed to a process of forming a calender roll. The process includes forming an elastic coating that includes a colorant, whereby the elastic coating changes color depending upon a temperature of the elastic coating, and applying the elastic coating to a calender roll body.

The present invention may also be directed to a process of operating a calender composed of at least one calender roll having an elastic coating that changes color depending upon a temperature of the coating. The process may include guiding a web through the calender, pressing the web between the at least one calender roll and a counter calender roll, monitoring a color of the elastic coating, and adjusting a load for pressing the web in accordance with changes in the color of the elastic coating.

In accordance with another feature of the present invention, the at least one calender roll may be composed of a deflection compensation roll that includes a plurality of press zones. The process may further include individually monitoring the color of the elastic coating at each press zone, and adjusting the load in individual press zones in accordance with changes in the color of the elastic coating in the individual press zones.

In accordance with still another feature of the present invention, excessive pressing force increases a temperature in the nip.

In accordance with yet another feature of the present invention, insufficient pressing force decreases a temperature in the nip.

The present invention is also directed to a coating for a calender roll. The coating includes an elastic material and a colorant adapted to change a color of the elastic material in accordance with a temperature of the elastic material.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
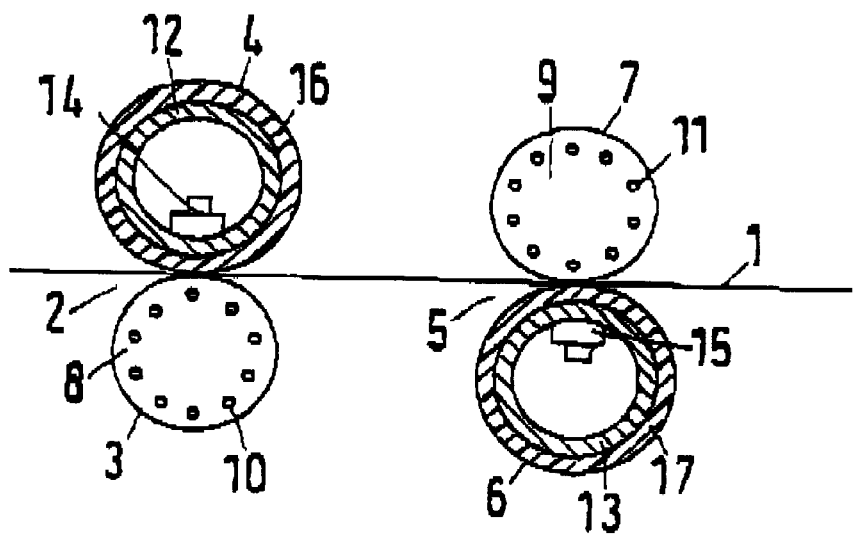
FIG. 1 illustrates a schematic view of a compact calender.

In the calender according to FIG. 1, a paper web 1 may be guided or fed through a first roll nip (or gap) 2 that is formed by calender rolls 3 and 4 and through a second roll nip 5 that is formed by calender rolls 6 and 7. Calender rolls 3 and 7 may be, e.g., heated rolls and may be include axial channels for transporting a heating medium 10 and 11 through a roll body 8 and 9, respectively. Roll bodies 8 and 9 may be made of, e.g., cast iron and may have a hard smooth surface. Calender rolls 4 and 6 may be deflection (or bending) adjustment rolls and may include a jacket 12 and 13, which may be pressed against opposing calender rolls 3 and 7, e.g., by hydrostatic support elements 14 and 15. A plurality of support elements 14 and 15 may be axially arranged within calender rolls 4 and 6 and may be e.g., driven by zone or independently of each other. Roll jackets 12 and 13 may include a coating 16 and 17 made of, e.g., an elastic coating material that substantially evens out compression of paper web 1 passing through first and second roll nips 2 and 5, thereby substantially preventing "black glazing." In practice, a maximum permissible temperatures for coatings such as these may be, e.g., between approximately 100 and 150° C.

Figure 2:
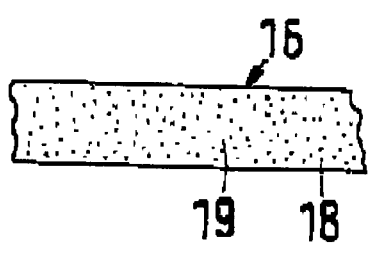
FIG. 2 illustrates a section through an elastic coating of the calender depicted in FIG. 1.

Coating 16, which is illustrated in greater detail FIG. 2, may include a color material (colorant) 19 that changes its color as a function of, e.g., temperature of a plastic coating 18, which may include, e.g., color pigments and/or color crystals. Plastic coating 18 may also be reinforced by fibers (not shown).

Figure 3:
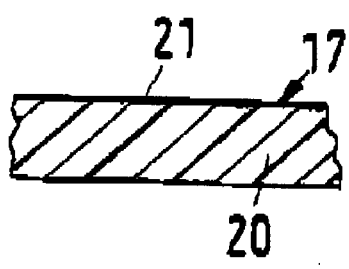
FIG. 3 illustrates a section through an alternative embodiment of the elastic coating depicted in FIG. 1.

In an alternative embodiment depicted in FIG. 3, coating 17 may include a plastic coating 20. A color material 21, which changes its color in accordance with temperature, may be, e.g., laid onto the surface of coating 17. Color material 21 may be provided, e.g., in the form of a color or lacquer coat.

A large number of materials that exhibit or display a color transition at a wide variety of temperatures are known. For example, ortho salts change into pyro salts upon heating. Further, the color material, as discussed above, may include, e.g., copper, nickel, cobalt, chrome, vanadium, molybdenum, or uranium salts. As an example, the colorant "Irgalit Rubine" from Ciba Geigy, Basel, Switzerland, has been shown to provide advantageous results for irreversible color transition, e.g., at a temperature between approximately 150° C. and 160° C. Other colorants, for providing reversible or irreversible color transition may be found by referring to "Römpp Chemie-Lexikon" ["Römpp Chemistry Lexicon"] 1992, 9th edition, volume 6, page 4491.

A wide range of materials may be suitable as the plastic material. In particular, the plastic material may be composed of, e.g., epoxide, epoxy resin, polyester, polyurethane, and/or phenol resin, which can be combined with carbon, aramide, and polyethylene fibers. For example, coatings similar to the coating "Janu Tec" from Voith Sulzer Finishing GmbH, Krefeld, Germany or to the coating "Jalon Yellow" from Stowe Woodward, Dueren, Germany may be utilized, such that, with the addition of a specific colorant or colorants (as described above), the resulting coating, in accordance with the features of the present invention, would exhibit color transitions at at least one specified temperature. The specified colorant or colorants may be added to coating material, e.g., prior to curing, so that the colorant becomes part of the coating itself.

Depending on the loading on coating 16 and 17 and first and second roll nips 2 and 5, the color material may be selected so that a color change may occur at a desired temperature, so as to withstand the loads that generally occur in the roll nips, and so as to be compatible with the elastic base material. For example, the color transition may occur at a temperature between approximately 90° C. and 190° C., and preferably between approximately 110° C. and 160° C.

The color transition of coatings 16 and 17 upon reaching a predetermined temperature may be utilized in various ways. For example, the color transition may be utilized as follows:

1. The color material may be utilized for the purpose of overload protection. A foreign object, e.g., a paper strip, which is present on the mating roll can cause a strong local load to occur that can lead to destruction of the coating after a while. In accordance with the present invention, the color transition that occurs when the critical temperature is exceeded indicates the potential defect or destruction before the defect or destruction occurs. Therefore, the operator can prevent major damage by performing an emergency stop and/or removing the foreign object.

2. the color material may be utilized for controlling calender operation. As noted above, when the distribution of force in the roll nip is substantially even, a substantially even color appears across an entire length of the calender roll. If the color of the calender roll changes, the loads on the calender rolls must be changed either automatically or manually, e.g., by an operator. The load changes may be performed through adjusting zone-controlled support elements 14 and 15, or support elements 14 and 15 individually, so that an even color pattern again appears. In an automated control, e.g., a color measuring device, such as a color measuring camera or similar type device, may be arranged to monitor the color of the coating in the high load area, e.g., at or near the press nips. If uneven color patterns at or near the nip are noted by the color measuring device, the load may be adjusted to correct the uneven color pattern. For example, if the measured color in a specified area indicates a temperature that is too low, the system will increase the load in the specified area; if the measured color in a specified area indicates a temperature that is too high, the system will decrease the load in the specified area. Moreover, if a calender is utilized that additionally provides zone-wise heating, this control system may be further utilized to change a heating load.

3. The color material may be utilized for defect detection. For example, when using a color material having irreversible color transition, a location of a defect may remain visible for a long period of time, so that the causes of the defect can be investigated accurately.

Further, in accordance with the disclosed features of the present invention, it is within the purview of the ordinarily skilled artisan to vary from the exemplary embodiment without departing from the basic concept of the invention. For example, if the color coat possesses a certain inherent elasticity, color material 21 may be applied as a color coat directly onto a roll jacket.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A calender apparatus comprising:
   at least one calender roll body; and
   an elastic coating coupled to the at least one calender roll body, the elastic coating comprising a colorant, said colorant being adapted to change a color of the elastic coating depending upon a temperature of the elastic coating.

2. The apparatus in accordance with claim 1, the colorant being adapted to change color reversibly.

3. The apparatus in accordance with claim 1, the colorant being adapted to change color irreversibly.

4. The apparatus in accordance with claim 1, the colorant being adapted to display one color transition related to a predetermined temperature.

5. The apparatus in accordance with claim 1, the colorant being adapted to display a plurality of color transitions, each color transition being related to a respective predetermined temperature.

6. The apparatus in accordance with claim 1, wherein the color transition of the colorant occurs at a temperature above a maximum permissible coating temperature.

7. The apparatus in accordance with claim 1, wherein the color transition of the colorant occurs at a temperature one of equal to or slightly lower than a maximum permissible coating temperature.

8. The apparatus in accordance with claim 1, the colorant comprising color pigments.

9. The apparatus in accordance with claim 1, the colorant comprising color crystals.

10. The apparatus in accordance with claim 1, the colorant comprising at least one member selected from a group of salts consisting of copper, nickel, cobalt, chrome, vanadium, molybdenum, and uranium salts.

11. The apparatus in accordance with claim 1, the coating being composed of a plastic material.

12. The apparatus in accordance with claim 11, wherein the colorant is added to the plastic material.

13. The apparatus in accordance with claim 1, the elastic coating being composed of an elastic color coat.

14. A calender apparatus comprising:
   at least one calender roll body; and
   an elastic coating coupled to the at least one calender roll body; and
   a colorant being laid onto a surface of the elastic coating, wherein the colorant is adapted to change color depending upon a temperature of the elastic coating.

15. A calender apparatus comprising:
   at least one calender roll body; and
   an elastic coating coupled to the at least one calender roll body, the elastic coating comprising a colorant, said colorant being adapted to change a color of the elastic coating depending upon a temperature of the elastic coating;
   the at least one calender roll comprising a deflection adjustment roll having a plurality of press zones; and
   the plurality of press zones being controllable as a function of a color pattern of the elastic coating.

16. A calender roll comprising:
   a calender roll body;
   an elastic coating disposed on the calender body comprising a colorant, wherein the colorant being adapted to change a color of the elastic coating depending upon a temperature of the elastic coating.

17. A process of forming a calender roll comprising:
   forming an elastic coating that includes a colorant, wherein the colorant being adapted to change a color of the elastic coating depending upon a temperature of the elastic coating; and
   applying the elastic coating to a calender roll body.

18. The process in accordance with claim 17, wherein the colorant comprises color pigments.

19. The process in accordance with claim 17, wherein the colorant comprises color crystals.

20. The process in accordance with claim 17, wherein the colorant comprises at least one member selected from a group of salts consisting of copper, nickel, cobalt, chrome, vanadium, molybdenum, and uranium salts.

21. The process in accordance with claim 17, wherein the coating is composed of a plastic material.

22. The process in accordance with claim 21, further comprising adding the colorant to the plastic material.

23. The process in accordance with claim 17, further comprising laying the colorant onto a surface of the elastic coating.

24. A process of operating a calender composed of at least one calender roll having an elastic coating that changes color depending upon a temperature of the coating, the process comprising:
   guiding a web through the calender;
   pressing the web between the at least one calender roll and a counter calender roll;
   monitoring a color of the elastic coating; and
   adjusting a load for pressing the web in accordance with changes in the color of the elastic coating.

25. The process in accordance with claim 24, the at least one calender roll being composed of a deflection compensation roll that includes a plurality of press zones, the process further comprising:
   individually monitoring the color of the elastic coating at each press zone; and
   adjusting the load in individual press zones in accordance with changes in the color of the elastic coating in the individual press zones.

26. The process in accordance with claim 24, wherein excessive pressing force increases a temperature in a nip formed between the at least one calender roll and the counter calender roll.

27. The process in accordance with claim 24, wherein insufficient pressing force increases a temperature in a nip formed between the at least one calender roll and the counter calender roll.

28. A calender apparatus comprising:
   at least one calender roll body; and
   an elastic coating coupled to the at least one calender roll body, the elastic coating comprising a colorant, said colorant to change a color of the elastic coating depending upon a temperature of the elastic coating; and
   the colorant being adapted to change the color of the elastic coating reversibly,
   wherein the color transition of the colorant occurs at a temperature one of equal to and slightly lower than a maximum permissible coating temperature.

29. A calender apparatus comprising:
   at least one calender roll body;
   an elastic coating coupled to the at least one calendar roll body, the elastic coating comprising a colorant, said colorant to change a color of the elastic coating depending upon a temperature of the elastic coating; and
   the colorant being adapted to change the color of the elastic coating irreversibly,
   wherein the color transition of the colorant occurs at a temperature above a maximum permissible coating temperature.

30. A calender apparatus comprising:
   at least one calender roll body; and
   an elastic coating coupled to the at least one calender roll body, the elastic coating comprising a colorant, said colorant exhibits a color transition at at least one temperature of the elastic coating.

* * * * *